UNITED STATES PATENT OFFICE.

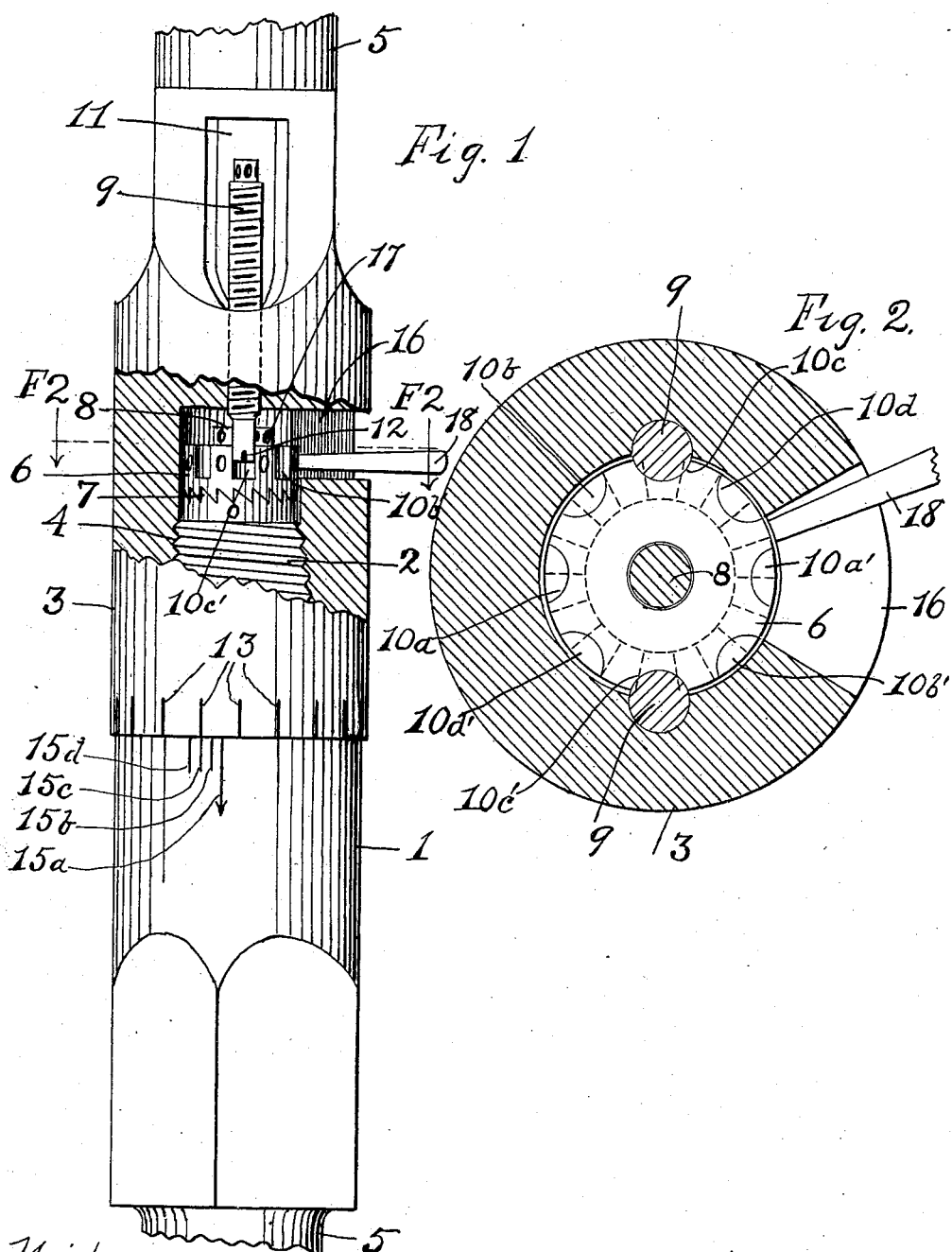

WILLIAM BARROTT, OF DE BEQUE, COLORADO.

RATCHET-LOCK FOR SCREW-JOINTS OF WELL-DRILLING TOOLS.

No. 903,435.  Specification of Letters Patent.  Patented Nov. 10, 1908.

Application filed June 13, 1908. Serial No. 438,387.

*To all whom it may concern:*

Be it known that I, WILLIAM BARROTT, a citizen of the United States, and a resident of De Beque, in the county of Mesa and State of Colorado, have invented certain new and useful Improvements in Ratchet-Locks for Screw-Joints of Well-Drilling Tools, of which the following is a specification.

My invention relates to improvements in means for locking the screw-joints of well drilling tools so as to prevent their becoming accidentally unscrewed while in operation in a well; and the object of my invention is to provide an adjustable key seat with screw keys whereby the screw joint may always be readily and securely locked when screwed together as tightly as is possible, making it impossible for the joints to become accidentally unscrewed, and to inclose and protect the mechanism so that none of the parts can become loosened or disconnected when the tools are in operation in a well. I attain these objects by means of the mechanism shown in the accompanying sheet of drawings, in which:—

Figure 1 is a side view showing one of the joints tightly screwed together and locked, a portion of the box collar being cut away to show the adjustable key seat, and Fig. 2 is an enlarged sectional view on the line $F^2$—$F^2$ of Fig. 1.

Similar reference characters refer to similar parts in both views.

I have shown my invention in connection with what is known as the taper joint, although it may be applied as readily to straight joints.

1 is the pin collar, 2 is the pin, and 3 is the box collar provided internally with threads 4 into which the pin 2 may be screwed tightly as shown, thereby connecting the stems or tools 5 when they are to be used in drilling a well.

Heretofore the friction of the joints, when tightly screwed together, has been relied upon to prevent accidental unscrewing and disconnection of the collars, when the tools are in operation in drilling a well, resulting in injuring the joints by battering the threads, and in expense and loss of time in recovering the tools thus left in the well. Owing to the wear of the threads of the joints from their being frequently screwed and unscrewed in practical operation, the relative angular position of the collars when screwed together as tightly as possible varies from time to time. This makes it essential that any device for positively locking the joints when tightly screwed up must not be fixed but capable of adjustment as the relative angular position of the collars when tightly screwed together varies with the wear of the threads.

My locking device consists of an adjustable key seat 6 provided with ratchet teeth 7 which fit into similar ratchet teeth cut in the upper end of the threaded pin 2. The adjustable key seat 6 is secured to the upper end of the pin 2 by means of a bolt 8, the partial unscrewing of which allows the key seat to be raised from the lower teeth sufficiently to permit of its rotation. Two screw keys 9 are fitted into threaded holes in the box collar in such location that when screwed down their lower ends will enter into two of the diametrically opposite key slots 10, when the pin and box collars are screwed together provided the adjustable key seat 6 has been rotated so as to bring the key slots into the correct position, in the manner to be hereafter described.

The round or hexagonal heads of the set screws are accessible through slotted openings 11 for the purpose of screwing or unscrewing them by means of a suitable wrench or pin when the joints are to be locked or unlocked. The heads are small enough to allow the screws to be inserted from below, the lower end being slotted at 12 to allow the use of a screw driver when the screw keys are inserted. The upward movement of the screw keys 9 being limited by the slotted openings 11 it is impossible for them ever to become detached from or extend out beyond the surface of the collar while the tools are in operation.

In order to provide for a closer adjustment of the key seat 6 without making too large a number of the ratchet teeth and therefore making them too small to have the required strength, a plurality of the key slots are cut in the edge of the adjustable key seat. In the construction shown, four of the key slots are provided on each semicircumference of the key seat, designated in Fig. 2 as 10ª, 10ᵇ, 10ᶜ, 10ᵈ, and 10ª′, 10ᵇ′, 10ᶜ′, 10ᵈ′. The key slots 10ª and 10ª′ are located respectively one-quarter, one-half and three-quarters of the width of a tooth to the left of the vertical edge of a tooth, as is clearly shown in Fig. 2.

In order to determine readily which one of the key slots 10ª, etc. should be set at the proper point to line up with the screw keys 9 when the joints are screwed together as tightly as desired, suitable graduations may be located on the exterior of the collars as shown in Fig. 1. The graduations 13 on the box collar correspond in number and pitch with the ratchet teeth 3, being eighteen in number in this instance, and two diametrically opposite graduations are exactly in line with the screw keys 9. The line 15ª on the pin collar is directly in line with the vertical edge of one of the fixed ratchet teeth which has a distinguishing mark 0 to indicate it as the initial tooth. The graduations 15ᵇ, 15ᶜ, and 15ᵈ to the left of the initial line 15ª are each one-fourth of the unit graduations 13 on the box collar. It will now be evident that when the initial line 15ª on the pin collar is in line with any one of the graduations 13 on the box collar, and the adjustable key seat 6 is so adjusted that the center of the recess 10ª will be directly in line with the initial tooth 0 of the fixed ratchet, the screw keys 9 will exactly register with the key slots 10ª and 10ª′. Furthermore, when either of the one-fourth unit graduations is in line with one of the graduations 13 it will be evident that if the key slots 10ᵇ, 10ᶜ or 10ᵈ be successively brought into line with the initial tooth 0, the screw keys will exactly register successively with said key slots. In the drawings the quarter graduation 15ᶜ registers with one of the graduations 13 on the box collar, indicating that the key slots 10ᶜ or 10ᶜ′ in the adjustable key seat 6 should be brought into line with the initial point in order that the screw keys 9 may enter said key slots as shown.

In order that the adjustable key seat may be rotated after the joints are screwed together so as to bring the desired key seat in line with the initial tooth 0 of the fixed ratchet, a radial horizontal slot 16 may be provided in the box collar, directly opposite the ratchet collar, with holes 17 driven in the side of the adjustable key seat, one between each key slot. A pin 18 may then be used to rotate the adjustable key seat 6 step by step until it is brought to the desired position. The pin 18 or a suitable wrench may then be used to screw down the bolt 8 and then the set screws 9 until their lower ends enter the key slots thereby securely locking the box collar to the adjustable key seat, and making it impossible for the joint to be unscrewed until the screw keys 9 are withdrawn from the key slots in the adjustable key seat.

If preferred, the radial slot 16 and pin 18 may be dispensed with in which case the proper adjustment of the adjustable key seat 6 may be effected as follows:—

The box and pin collars are first screwed together as tightly as desired and the graduation on the pin collar which registers with one of the graduations 13 on the box collar is noted, this being in the drawing 15ᶜ. The joint is then unscrewed and the adjustable key seat 6 rotated so as to bring the key slot 10ᶜ′ over the initial point 0 and securing it in this position by means of the bolt 8. The joint is then screwed together to the same graduations as before and the screw keys 9 screwed down entering the key slots and locking the adjustable key seat to the box collar and making it impossible to unscrew the joint until the screw keys are withdrawn.

The number of ratchet teeth and graduations may be varied as desired from that here shown and described, or the fixed graduations may be entirely dispensed with if desired. In this case a temporary mark would be made in the pin collar in line with one of the screw keys when the joints are first screwed up, then unscrewing the joint when the proper adjustment of the adjustable key seat can be determined, by lining up from the initial point by a suitable straight edge, when the key seat may be rotated by hand as required.

What I claim as my invention is:—

1. In well drilling tools the combination with a pin collar and a box collar, of ratchet teeth cut on the end of the pin, an adjustable key seat having teeth fitting said pin ratchet teeth and adapted to be rotated on its axis, and means whereby said adjustable key seat may be properly adjusted and means whereby the key seat may be securely locked to the box collar.

2. In well drilling tools the combination with a pin collar and a box collar, of ratchet teeth cut on the end of the pin, an adjustable key seat having teeth fitting said pin ratchet teeth, means for properly adjusting said key seat, and means whereby said key seat may be securely locked to the box collar in the desired position.

3. In well drilling tools the combination with a pin collar and a box collar, of ratchet teeth cut on the end of the pin, an adjustable key seat having teeth fitting said pin ratchet teeth, a radial slot in the box collar, an adjusting pin for properly adjusting said key seat, and means whereby said key seat may be securely locked to the box collar.

4. In well drilling tools the combination with a pin collar and a box collar, of ratchet teeth cut on the end of the pin, an adjustable key seat having teeth fitting said pin ratchet teeth and key slots in its edge, a radial slot in the box collar, an adjusting pin for rotating the adjustable key seat, so as to bring the key slots in the desired position, and screw keys for securely locking the key seat to the box collar.

Signed at Grand Junction, in the county of Mesa and State of Colorado.

WILLIAM BARROTT.

Witnesses:
H. L. McClintock,
James S. Carnahan.